United States Patent
Medina, III

(10) Patent No.: US 7,865,435 B1
(45) Date of Patent: Jan. 4, 2011

(54) SYSTEMS AND METHODS FOR IMPLEMENTING INTELLIGENT BANKING ACCOUNT SYSTEM

(75) Inventor: Reynaldo Medina, III, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/037,175

(22) Filed: Feb. 26, 2008

Related U.S. Application Data

(60) Provisional application No. 60/992,818, filed on Dec. 6, 2007.

(51) Int. Cl.
*G06Q 40/00* (2006.01)

(52) U.S. Cl. .............. 705/39; 705/35; 705/38; 705/40; 705/42; 235/379; 709/229

(58) Field of Classification Search ............ 705/35, 705/38, 39, 40, 42; 235/379; 709/229
See application file for complete search history.

(56) References Cited

U.S. PATENT DOCUMENTS

| | | | |
|---|---|---|---|
| 5,893,078 A * | 4/1999 | Paulson ................. | 705/35 |
| 5,933,817 A * | 8/1999 | Hucal .................... | 705/39 |
| 7,383,223 B1 * | 6/2008 | Dilip et al. ............ | 705/39 |
| 7,546,945 B1 * | 6/2009 | Bucci et al. ............ | 235/379 |
| 2002/0023055 A1 * | 2/2002 | Antognini et al. ....... | 705/40 |
| 2004/0111370 A1 * | 6/2004 | Saylors et al. ........... | 705/40 |
| 2004/0177036 A1 * | 9/2004 | Nutahara et al. ........ | 705/39 |
| 2005/0160038 A1 * | 7/2005 | Albornoz ................ | 705/42 |
| 2006/0136595 A1 * | 6/2006 | Satyavolu .............. | 709/229 |
| 2006/0212385 A2 | 9/2006 | Bent et al. | |
| 2006/0282374 A1 * | 12/2006 | Stone .................... | 705/38 |
| 2007/0271174 A2 * | 11/2007 | Bent et al. ............ | 705/38 |
| 2008/0015982 A1 * | 1/2008 | Sokolic et al. .......... | 705/39 |

OTHER PUBLICATIONS

Dratch, Dana; "The Perils of Automatic Bill Pay"; Bankrate.com; downloaded Nov. 29, 2007; http://articles.moneycentral.msn.com/Banking/Better Banking/ThePerilsOfAutomaticBillPay.aspx.

(Continued)

*Primary Examiner*—Ella Colbert
*Assistant Examiner*—Sanjeev Malhotra
(74) *Attorney, Agent, or Firm*—Perkins Coie LLP

(57) ABSTRACT

A person stores funds in a lower interest checking account and a higher interest savings account of a banking institution. For each of a plurality of cycles, funds are received at the beginning of the cycle from an amount of income ('INC') of the person. An amount at least equal to a total amount of regularly recurring bills of the person that have a generally fixed amount ('FIX') is deposited into a bills account of the person, and at least a portion of a remainder of INC is deposited into the checking account. During the cycle, the person pays the regularly recurring bills from the bills account and other bills from the checking account. At the end of the cycle, a final amount left in the checking account above a floor value ('FLO') is transferred to the savings account. Thus, excess funds are not allowed to accumulate in the checking account.

21 Claims, 3 Drawing Sheets

OTHER PUBLICATIONS

"Automatic Savings Programs: Pay Yourself First"; Harleysville National Bank; downloaded Nov. 29, 2007; http://www.harleysvillebank.com/wealthinfo/savings/2007-11-08-autosavings.asp; Copyright 2007 Harleysville National Corporation.

"Automatic Savings Plan"; American Federal Bank; downloaded Nov. 29, 2007; http://www.americanfederalbank.com/autosaving.htm; Copyright 1998 American Federal Bank.

"Automatic Savings Plan"; Washington Mutual; downloaded Nov. 29, 2007; http://www.wamu.com/personal/account_automatic_savings/default.asp; Copyright 2007 Washington Mutual, Inc.

"FAQ: Managing My Money—Automatic Savings Plan"; ING Direct; downloaded Nov. 29, 2007; http://home.ingdirect.com/faqs.asp?s=AutomaticSavingsPlan.

* cited by examiner

US 7,865,435 B1

SYSTEMS AND METHODS FOR IMPLEMENTING INTELLIGENT BANKING ACCOUNT SYSTEM

CROSS-REFERENCE TO RELATED APPLICATION(S)

The present application claims the benefit of U.S. Provisional Application No. 60/992,818 filed Dec. 6, 2007; said application is hereby incorporated herein by reference in its entirety. Further, the present application is filed concurrently with and shares a common title and disclosure with the following applications, each of which is hereby incorporated herein by reference in its entirety:

U.S. patent application Ser. No. 12/037,164; and
U.S. patent application Ser. No. 12/037,170.

FIELD

The present disclosure is directed to systems and methods that assist with implementing an intelligent banking account system for a person or other entity (hereinafter, 'person') with banking accounts at a banking institution or the like. More particularly, the present disclosure is directed to such systems and methods that automatically move funds between checking and savings accounts of the person in an effort to minimize the time funds reside in the checking account and correspondingly maximize the time funds reside in the savings account.

BACKGROUND

It is usually the case that a person having more than a minimum amount of income employs a banking institution to store the income as funds in one or more accounts, and also to distribute such funds in the regular course of living, such as for example to pay bills and to acquire cash for spending. Typically, although by no means exclusively, the person has both a checking account from which funds may be drawn to pay corresponding checks, and a savings account from which funds may be stored at and saved. Also typically, the funds in the savings account earn an amount of interest, usually expressed as an annual percentage rate, and the funds in the checking account may also earn an amount of interest, also usually expressed as an annual percentage rate. However, the interest paid on funds in a checking account is usually far less than the interest paid on funds in a savings account.

Accordingly, the person should be careful to ensure that excess funds in the checking account thereof are transferred to the savings account thereof, if only to earn a higher rate of interest on such excess funds. That said, though, the person is probably like most people and therefore does not have the discipline necessary to manage the funds in the checking and savings accounts thereof so as to in fact ensure that such excess funds in the checking account are indeed transferred to the savings account. In particular, such management entails regularly monitoring both the checking and savings accounts as well as bills and other expenses that are regularly paid from such checking account, projecting an amount of funds that must reside in the checking account at any particular time to pay such bills and other expenses, and transferring the funds between the accounts at appropriate times.

The effort necessary to perform such management tasks may seem overwhelming to the person, and the person at some point may resign himself or herself to just leave all the funds in the checking account to ensure that such funds are available to pay the bills and other expenses. Of course, doing so represents a lost opportunity to earn increased interest on the excess funds that are not in fact necessary to be in such checking account but that instead could be in the savings account.

Accordingly, a need exists for systems and methods for implementing an intelligent banking account system that earns increased interest for the person by attempting to minimize the time the excess funds of the person reside in the checking account and correspondingly maximize the time such excess funds reside in the savings account. More particularly, a need exists for such a system and method that identifies such excess funds based on income of the person received and bills and other expenses of the person paid, and that automatically moves such excess funds from the checking account to the savings account.

SUMMARY

The aforementioned needs are satisfied at least in part by a system and method with regard to a person storing funds in at least a checking account and a savings account of a banking institution. The funds in the savings account earn a relatively high amount of interest and the funds in the checking account earn a relatively low amount of interest. For each of a plurality of cycles, funds are received at the beginning of the cycle from an amount of income ('INC') of the person. An amount at least equal to a total amount of regularly recurring bills of the person that have a generally fixed amount ('FIX') is deposited into a bills account of the person, and at least a portion of a remainder of INC is deposited into the checking account of the person.

During the cycle, the person pays the regularly recurring bills from the bills account and other bills from the checking account. At the end of the cycle, a final amount left in the checking account above a floor value ('FLO') is transferred to the savings account to earn the relatively high amount of interest thereof. Thus, funds are not allowed to accumulate in the checking account to earn only the relatively low amount of interest thereof.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
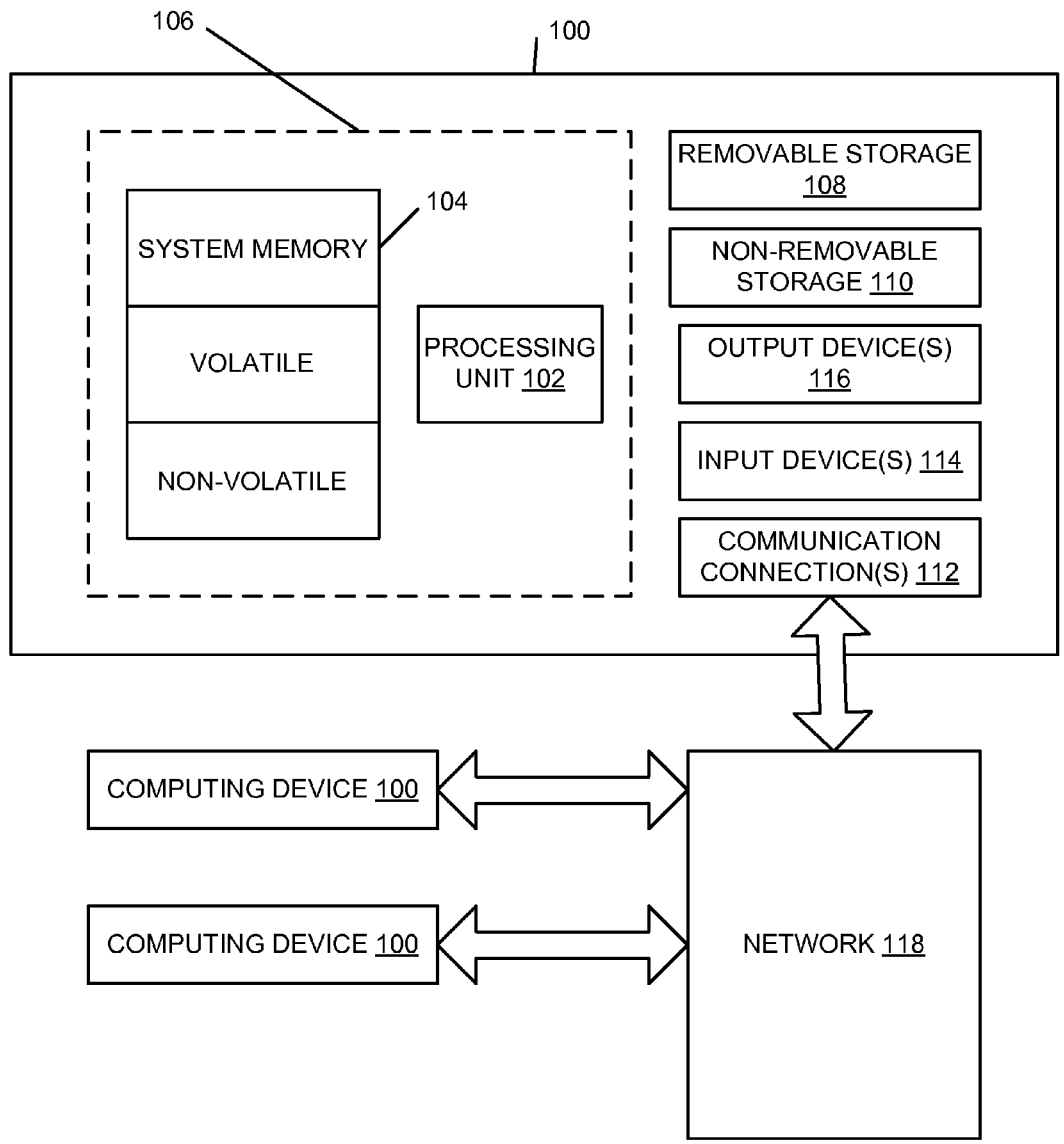
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In a basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Banking Scenario

Figure 2:
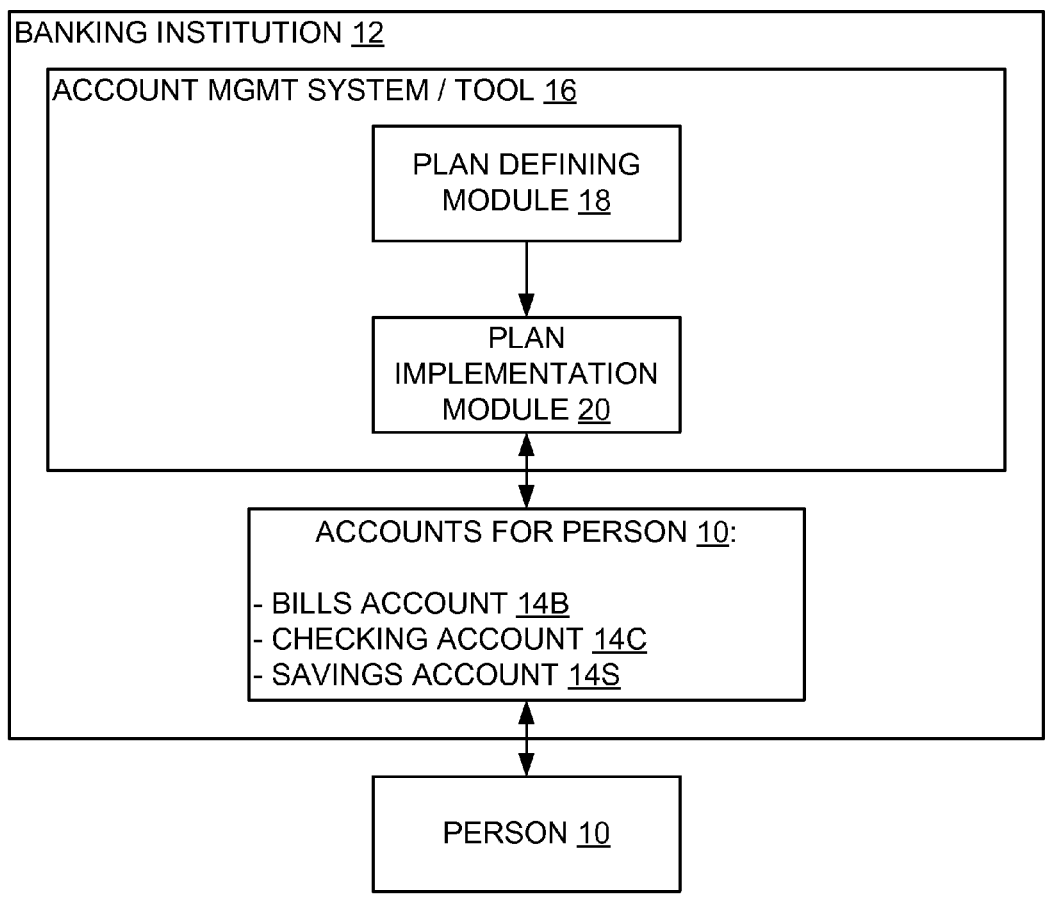
FIG. 2 is a block diagram of a banking institution with an intelligent banking account system in accordance with various embodiments of the present innovation.

As was set forth above, and turning now to FIG. 2, a person 10 has regular income and employs a banking institution 12 to store the income as funds in at least a checking account 14c and a savings account 14s as provided by such banking institution 12. Here, the person 10 may be an individual or may be a married couple, a corporation or other organization, or the like, and the banking institution 12 may be a bank or may be another institution that performs banking services, such as for example a credit union, a savings society, a brokerage house, a funds management institution, or the like. Presumably, the income is received on a regular basis, such as biweekly or monthly, and may be from a source such as a job, payment received for services regularly rendered, funds earned from a trust, annuity, franchise agreement, pension, or the like, dividends and/or interest earned on securities, and the like.

Also presumably, the checking account 14c is employed by the person 10 to store funds that are to be drawn to pay corresponding checks or other outlays such as electronic funds transfers, wire transfers, automated clearing house (ACH) payments, and the like, while the savings account 14s is employed by the person 10 to store funds that are not presently needed but that are to be put aside, perhaps for later use. As was set forth above, the funds in the savings account 14s of the person 10 typically earn a relatively high amount of interest, while the funds in the checking account 14c of the person typically earn a relatively low amount of interest. For example, the checking account 14c may earn interest at an annual rate in the range of 0.2 percent, while the savings account 14s may earn interest at an annual rate in the range of 2 percent.

Accordingly, and again, the person 10 should if at all possible ensure that excess funds in the checking account 14c thereof are transferred to the savings account 14s thereof, if only to earn the higher rate of interest on such excess funds. However, doing so is not an especially simple matter, especially if the amount of funds necessary to be in the checking account 14c to pay bills and other expenses varies from day to day. As should be understood, the checking account 14c of the person 10 should always have enough funds therein to pay checks and other instruments drawn against such checking account 14c so as to avoid an overdraft in such checking account 14c. Such overdraft is to be avoided because the banking institution 12 may charge a substantial fee for such overdraft, and also because the banking institution 12 may not honor a check or other instrument drawn against the checking account 14c when such an overdraft occurs.

As a result, the person 10 may decide out of an abundance of caution to leave excess funds in the checking account 14c to avoid such an overdraft. Alternately, the person 10 may simply leave excess funds in the checking account 14c through inattentiveness or even carelessness. In either case, and as should be appreciated, such excess funds in the checking account 14c represent a lost opportunity to earn a substantially greater amount of interest if only such excess funds were transferred to the savings account 14s.

Intelligent Banking Account Management System

Accordingly, in various embodiments of the present innovation, an intelligent banking account management system 16 is provided as a tool for use by the person 10 in an effort to ensure that excess funds in the checking account 14c of the person 10 are transferred to the savings account 14s of such person 10 on a regular basis. As a result, such excess funds do indeed earn a greater amount of interest for the person 10 as resident in the savings account 14s thereof as compared to if such excess funds remained in the checking account 14c of such person 10.

It is to be appreciated that such a system and tool 16 (hereinafter, 'tool 16') is typically computer-based, and therefore may be implemented on a computing device 100 such as that set forth above in connection with FIG. 1. Notably, such a computing device 100 may be any appropriate computing device without departing from the spirit and scope of the present innovation. For example, the computing device 100 may be a single personal-type computer or may be an industrial or high-capacity computing system or network of computers or the like if need be. Likewise, the computing device 100 may be owned and managed by the banking institution 12 or may be owned and/or managed by an agent on behalf of the banking institution 12.

Generally, the tool 16 includes a plan defining module 18 for receiving information from the person 10 and for formulating an excess funds plan based thereon for the person 10, and also for allowing the received plan to be updated and/or revised as necessary, and a plan implementation module 20 for implementing the received plan for the person 10. The tool 16 may be operated independent of any particular banking institution 12, although it is to be expected that a particular institution 12 may offer the tool 16 to customers thereof at least partially in an effort to ensure that the business of the customers remains with such institution 12.

The plan defining module 18 of the tool 16 may either receive the excess funds plan as produced and/or revised elsewhere, or may be employed to produce/revise such plan. The plan may be any appropriate plan without departing from the spirit and scope of the present innovation. Notably, the plan includes a number of values that are to be employed by the plan implementation module 20. Such plan as output by the plan defining module 18 may be any appropriate plan and take any appropriate form without departing from the spirit and scope of the present innovation. Thus, plan may be set forth as an eXtensible Markup Language (XML) document that sets forth the aforementioned values and perhaps other related information.

In various embodiments of the present innovation, the excess funds plan generally operates as follows. Preliminarily, the plan presumes not only a checking account 14c and a savings account 14s for the person 10, but also a bills account 14b that operates in the manner of the checking account 14c, but that is dedicated to paying regularly recurring bills of the person 10 that have a generally fixed amount. Each regularly recurring bill may be any bill that recurs regularly, such as for example a telephone bill, a mortgage bill, an automobile payment bill, or the like, especially if such bill has an amount of funds due that is fixed or at least does not vary significantly around an average amount. Typically, although not necessarily, recurring bills are issued monthly, and accordingly it is presumed at least for now that the tool 16 and the plan implementation module 20 thereof in particular operate on a monthly cycle, although other length cycles may also be employed.

Figure 3:
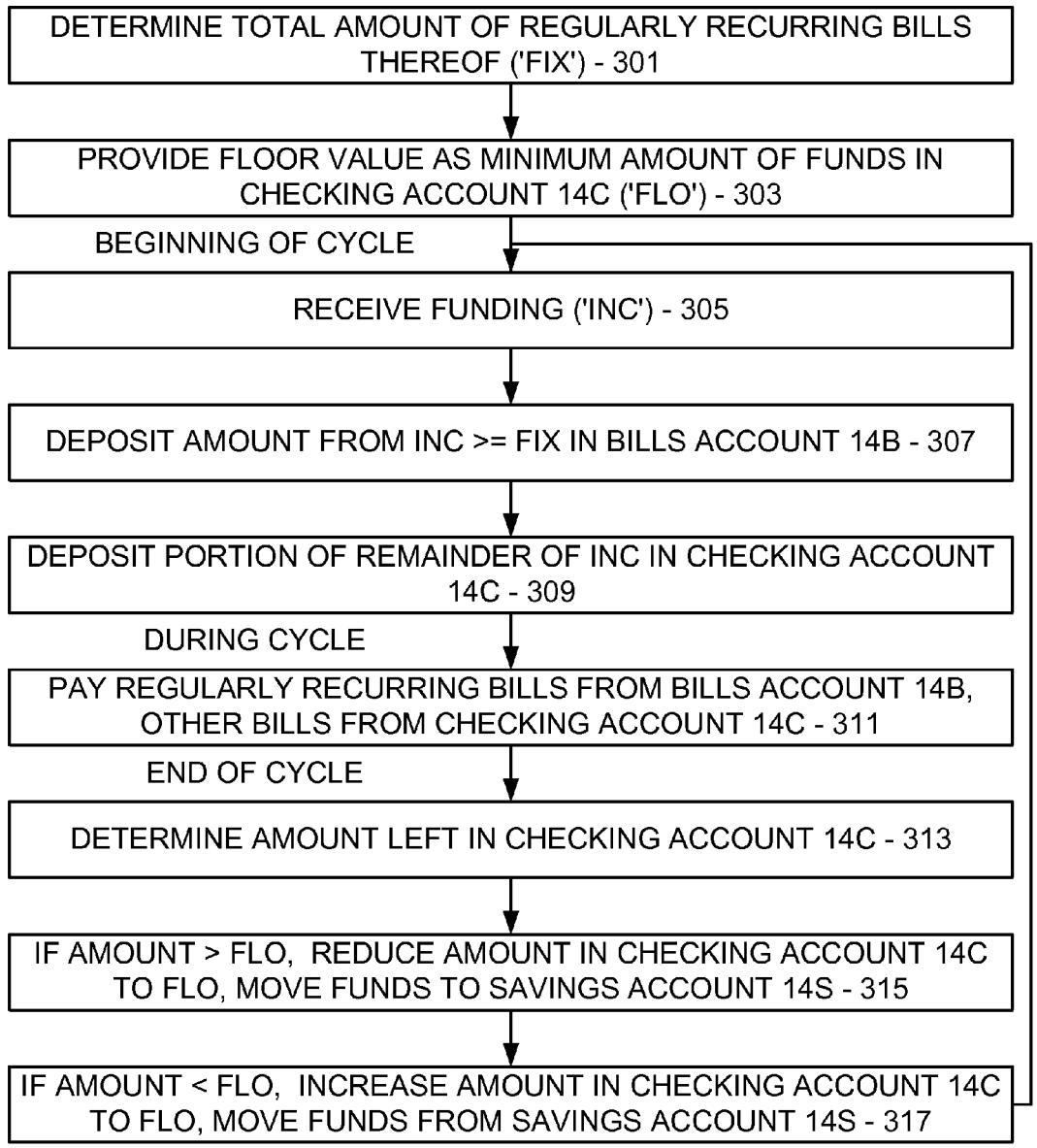
FIG. 3 is a flow diagram showing key actions performed in connection with the system of FIG. 2 in accordance with various embodiments of the present innovation.

At any rate, and turning now to FIG. 3, the person 10 with the aid of the tool 16 and particularly the plan definition module 18 thereof determines a total amount of the regularly recurring bills thereof (hereinafter, 'FIX'), again presumably on a monthly basis (301), where such regularly recurring bills are to be paid through the bills account 14b of such person 10. Thus, all other bills are to be paid by the person 10 through the checking account 14c thereof. Of course, such other bills can and will vary widely from month to month. Also, the person 10 provides a floor value (hereinafter, 'FLO') (303) which represents a minimum amount of funds that should be in the checking account 14c of the person 10 at the end of each month.

At any rate, once the plan defining module 18 produces the plan for the person 10, the plan may be saved and retrieved as appropriate, perhaps in a database or the like (not shown). It is to be appreciated that such plan is applied on a monthly cycle, or perhaps another length cycle, by the plan implementation module 20, and particularly at the start of each cycle, which is of course the end of the previous cycle. Thus, it is expected that the person 10 during the course of a particular cycle in fact pays regularly recurring bills as appropriate from the bills account 14b and other bills from the checking account 14c thereof, perhaps by way of checks or by electronic bill paying functionality of the banking institution 12, and that the plan implementation module 20 operates between cycles to adjust such accounts 14b, 14c, as well as the savings account 14s of the person 10 as necessary according to the plan.

Still referring to FIG. 3, it is seen that the plan implementation module 20 operates according to the plan as follows. Preliminarily, it is assumed that the bills and checking accounts 14b, 14c need to be funded for the next particular cycle, and that such funding is received from an amount of income which is available from some source at the beginning of such next cycle (hereinafter, 'INC') (305). Such source may be any appropriate source, although it is likely that such source of INC is a job of the person 10. Presumably, INC has already been deposited into an account of the person 10 or is at least available to the plan implementation module 20.

Accordingly, the plan implementation module 20 ensures that an amount at least equal to FIX is in the bills account 14b of the person 10 by taking such amount from INC and in fact depositing such amount into the bills account 14b (307). Note here that the amount may be slightly greater than FIX to account for any slight increases in the regularly recurring bills that are paid from such bills account 14b. Thereafter the plan implementation module 20 deposits some portion of the remainder of INC into the checking account 14c (309). Such portion of the remainder of INC may be all of such remainder or a part thereof, in which case any of the remainder of INC left may be deposited into the savings account 14s to earn the higher interest rate thereof immediately.

Note that, rather than taking an amount that is slightly greater than FIX to account for any slight increases in the regularly recurring bills that are paid from such bills account 14b, changes in fixed bill prices may be detected and the cash flows may be adjusted accordingly. Note too that in the event that more funds are drawn from a particular account than are stored therein such that an overdraft occurs, excess funds from other accounts that do have funds can automatically be shifted to cover the overdraft. Also if in the event excess funds can be routed to at least one or multiple accounts, each having a varying interest rate, the excess funds can be routed to the accounts with the highest interest rate.

At any rate, during the course of the next particular cycle, the person 10 in fact pays regularly recurring bills as appropriate from the bills account 14b and other bills from the checking account 14c thereof, perhaps by way of checks or by electronic bill paying functionality of the banking institution 12 (311). Of course, with such payments, the amounts of funds in the billing and checking accounts 14b, 14c is reduced. Note here that it may be that due to extraordinary circumstances or even ordinary circumstances, additional funds may be required beyond that which is in such billing and checking accounts 14b, 14c. In such case, the person 10 may transfer more funds into such accounts 14b, 14c as necessary, perhaps from the savings account 14s of the person or from another source. Particularly if the additional funds are needed in the bills account 14b, the person 10 may update the plan thereof to increase FIX as appropriate.

At the end of the cycle, the plan implementation module 20 in effect closes out such cycle by determining what amount if any is left in the checking account 14c (313). If such amount is above FLO, such amount in the checking account 14c is reduced to FLO by transferring an appropriate amount of funds from the checking account 14c to the savings account 14s (315). Thus, the transferred amount in the savings account 14s enjoys the higher interest rate thereof. Alternately, if such amount is below FLO, such amount in the checking account 14c is increased to FLO by transferring an appropriate amount of funds from the savings account 14s to the checking account 14c (317). Thus, the transferred amount in the checking account 14c does not enjoy the higher interest rate of the savings account 14s, but the checking account is nevertheless funded for future contingencies. As seen in FIG. 3, inasmuch as the next cycle begins after the current cycle ends, the process continues back at (305) with regard to the next cycle.

Assuming that excess funds in the checking account 14c are transferred most every cycle to the savings account 14s as at 313, it is to be appreciated that the amount of funds in the savings account 14s of the person 10 can increase each month, and that such amount earns interest at the higher interest rate. Correspondingly, only those funds necessary for paying bills remain in the checking and bills accounts 14b, 14c of the person 10, and funds are not allowed to accumulate in the checking account 14c in particular, all the while earning interest only at the lower interest rate. As a result, the person earns more for the funds deposited at the banking institution 12.

Note here that the bills account 14b is not deemed to be absolutely necessary for proper operation of the tool 16. Instead, such bills account 14b is provided mainly as a mechanism to distinguish between regularly recurring bills and all other bills. Accordingly, in alternate embodiments of the present innovation, the bills account 14b may be dispensed with and all functionality thereof may be assumed by the checking account, of course with appropriate modification to the actions set forth above. Such modifications should be known or at least appreciated by the relevant public without any particular elaboration herein, and accordingly such elaboration is not believed to be necessary.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for implementing an intelligent banking account system and tool 16 that earns increased interest for a person 10 by attempting to minimize the time the excess funds of the person 10 reside in a checking account 14c thereof and correspondingly maximize the time such excess funds reside in a savings account 14s of the person. The tool 16 identifies such excess funds based on income of the person received and bills and other expenses of the person paid, and automatically moves such excess funds from the checking account 14c to the savings account 14s.

It should be appreciated that changes could be made to the embodiments described above without departing from the inventive concepts thereof. It should be understood, therefore, that this innovation is not limited to the particular embodiments disclosed, but it is intended to cover modifications within the spirit and scope of the present innovation as defined by the appended claims.

What is claimed is:

1. A computer-based method with regard to a person storing funds in at least a checking account and a savings account of a banking institution, the funds in the savings account of the person earning a high amount of interest and the funds in the checking account of the person earning a low amount of interest, the method for implementing an excess funds plan for the person to ensure that a final amount of funds in the checking account of the person are moved to the savings account of the person to earn the high amount of interest thereof, and comprising of:
    receiving the excess funds plan at a plan defining module of a computer device;
    producing at the plan defining module a number of values relating to the plan, including a total amount ('FIX') of regularly recurring bills of the person for each of a plurality of temporal cycles, the regularly recurring bills have a generally fixed amount, and a floor value ('FLO') as a minimum amount of funds that are to be in the checking account of the person at an end of each cycle; and
    actuating a plan implementation module of a computer device at a beginning and end of each cycle, the plan implementation module implementing the excess funds plan by, for each cycle:
    receiving, at the beginning of the cycle, funds from an amount of income ('INC') of the person;
    depositing, at the beginning of the cycle, an amount at least equal to FIX into a bills account of the person;
    depositing, at the beginning of the cycle, at least a portion of a remainder of INC into the checking account of the person;
    allowing, during the cycle, the person to pay the regularly recurring bills from the bills account and other bills from the checking account thereof;
    detecting, at the end of the cycle, if there has been an increase in any of the regularly recurring bills, and if so, increasing the FIX; and
    transferring, at the end of the cycle, the final amount left in the checking account above FLO to the savings account to earn the high amount of interest thereof;
    wherein funds are not allowed to accumulate in the checking account to earn only the low amount of interest thereof.

2. The method of claim 1 wherein the regularly recurring bills of the person that have a generally fixed amount are selected from among a telephone bill, a mortgage bill, and an automobile payment bill.

3. The method of claim 1 wherein the cycle is a monthly cycle.

4. The method of claim 1 further comprising determining FIX.

5. The method of claim 1 further comprising determining FLO.

6. The method of claim 1 wherein the amount at least equal to FIX is greater than FIX to account for possible increases in the regularly recurring bills.

7. The method of claim 1 wherein, at the beginning of the cycle, any of INC left after the deposits into the bills and checking accounts is deposited into the savings account to earn the high amount of interest thereof.

8. A computer-readable medium having stored thereon computer-executable instructions for implementing a computer-based method with regard to a person storing funds in at least a checking account and a savings account of a banking institution, the funds in the savings account of the person earning a high amount of interest and the funds in the checking account of the person earning a low amount of interest, the method for implementing an excess funds plan for the person to ensure that a final amount of funds in the checking account of the person are moved to the savings account of the person to earn the high amount of interest thereof, and comprising of:
    receiving the excess funds plan at a plan defining module;
    producing at the plan defining module a number of values relating to the plan, including a total amount ('FIX') of regularly recurring bills of the person for each of a plurality of temporal cycles, the regularly recurring bills have a generally fixed amount, and a floor value ('FLO') as a minimum amount of funds that are to be in the checking account of the person at an end of each cycle; and
    actuating a plan implementation module at a beginning and end of each cycle, the plan implementation module implementing the excess funds plan by, for each cycle:
    receiving, at the beginning of the cycle, funds from an amount of income ('INC') of the person;
    depositing, at the beginning of the cycle, an amount at least equal to FIX into a bills account of the person;
    depositing, at the beginning of the cycle, at least a portion of a remainder of INC into the checking account of the person;
    allowing, during the cycle, the person to pay the regularly recurring bills from the bills account and other bills from the checking account thereof;
    detecting, at the end of the cycle, if there has been an increase in any of the regularly recurring bills, and if so, increasing the FIX; and
    transferring, at the end of the cycle, the final amount left in the checking account above FLO to the savings account to earn the high amount of interest thereof;
    wherein funds are not allowed to accumulate in the checking account to earn only the low amount of interest thereof.

9. The medium of claim 8 wherein the regularly recurring bills of the person that have a generally fixed amount are selected from among a telephone bill, a mortgage bill, and an automobile payment bill.

10. The medium of claim 8 wherein the cycle is a monthly cycle.

11. The medium of claim 8 wherein the method further comprises determining FIX.

12. The medium of claim 8 wherein the method further comprises determining FLO.

13. The medium of claim 8 wherein the amount at least equal to FIX is greater than FIX to account for possible increases in the regularly recurring bills.

14. The medium of claim 8 wherein, at the beginning of the cycle, any of INC left after the deposits into the bills and checking accounts is deposited into the savings account to earn the high amount of interest thereof.

15. A computer-based system with regard to a person storing funds in at least a checking account and a savings account of a banking institution, the funds in the savings account of the person earning a high amount of interest and the funds in the checking account of the person earning a low amount of interest, the system for implementing an excess funds plan for the person to ensure that a final amount of funds in the checking account of the person are moved to the savings account of the person to earn the high amount of interest thereof, and comprising:

a plan defining module for receiving the excess funds plan, the plan defining module producing a number of values relating to the plan, including a total amount ('FIX') of regularly recurring bills of the person for each of a plurality of temporal cycles, the regularly recurring bills have a generally fixed amount, and a floor value ('FLO') as a minimum amount of funds that are to be in the checking account of the person at an end of each cycle; and a plan implementation module actuated at a beginning and end of each cycle, the plan implementation module implementing the excess funds plan by, for each cycle:

receiving, at the beginning of the cycle, funds from an amount of income ('INC') of the person;

depositing, at the beginning of the cycle, an amount at least equal to FIX into a bills account of the person, the person paying the regularly recurring bills from the bills account thereof during the cycle;

depositing, at the beginning of the cycle, at least a portion of a remainder of INC into the checking account of the person, the person paying other bills from the checking account thereof during the cycle;

detecting, at the end of the cycle, if there has been an increase in any of the regularly recurring bills, and if so, increasing the FIX; and transferring, at the end of the cycle, the final amount left in the checking account above FLO to the savings account to earn the high amount of interest thereof;

wherein funds are not allowed to accumulate in the checking account to earn only the low amount of interest thereof.

16. The system of claim 15 wherein the regularly recurring bills of the person that have a generally fixed amount are selected from among a telephone bill, a mortgage bill, and an automobile payment bill.

17. The system of claim 15 wherein the cycle is a monthly cycle.

18. The system of claim 15 wherein the plan defining module determines FIX.

19. The system of claim 15 wherein the plan defining module determines FLO.

20. The system of claim 15 wherein the amount at least equal to FIX is greater than FIX to account for possible increases in the regularly recurring bills.

21. The system of claim 15 wherein, at the beginning of the cycle, any of INC left after the deposits into the bills and checking accounts is deposited into the savings account to earn the high amount of interest thereof.

* * * * *

UNITED STATES PATENT AND TRADEMARK OFFICE
CERTIFICATE OF CORRECTION

PATENT NO.          : 7,865,435 B1                                        Page 1 of 1
APPLICATION NO.     : 12/037175
DATED               : January 4, 2011
INVENTOR(S)         : Reynaldo Medina, III It is certified that error appears in the above-identified patent and that said Letters Patent is hereby corrected as shown below:

Title Page, (73), Assignee, delete "States" and insert --Services--

Signed and Sealed this
First Day of March, 2011

David J. Kappos
*Director of the United States Patent and Trademark Office*